March 27, 1951          J. J. VISONE          2,546,801
STUD BEARING
Filed Feb. 17, 1948
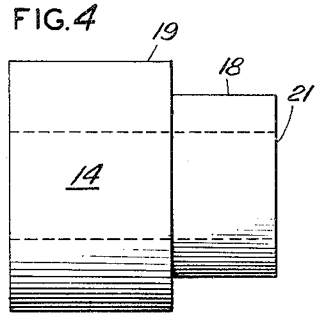
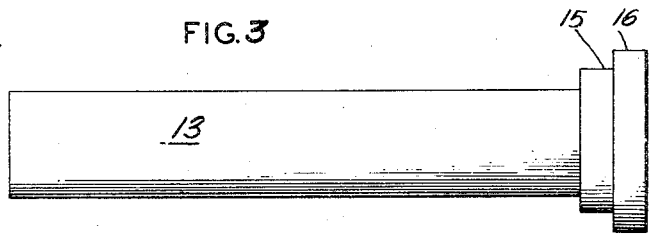
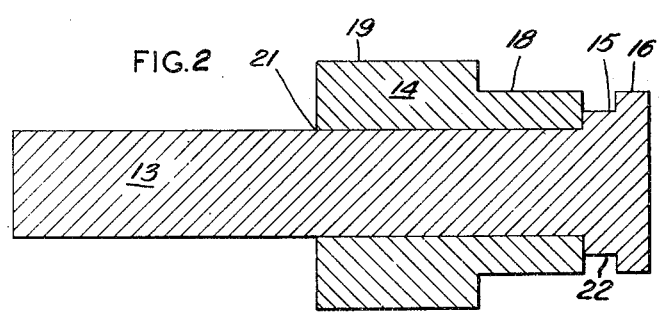
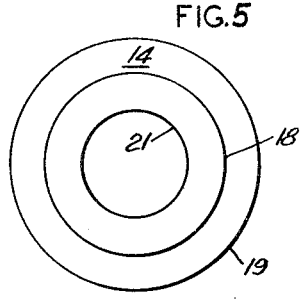
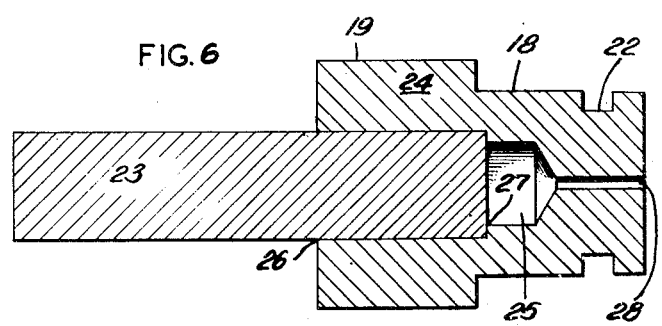
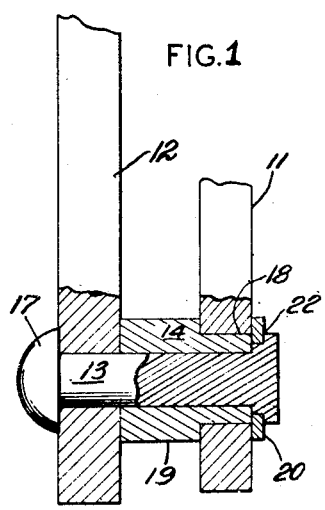
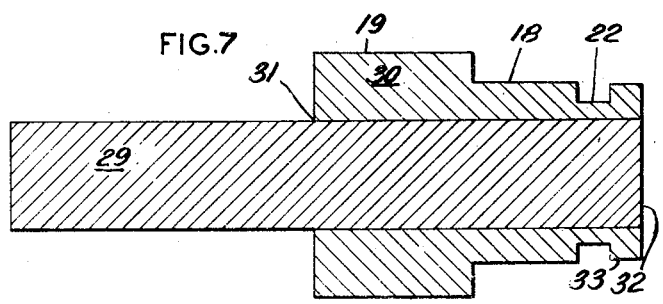
INVENTOR.
JOSEPH J. VISONE
BY
*J. L. Sterling*
ATTORNEY Patented Mar. 27, 1951

2,546,801

UNITED STATES PATENT OFFICE 2,546,801

STUD BEARING

Joseph J. Visone, Brooklyn, N. Y., assignor to Remington Rand Inc., New York, N. Y., a corporation of Delaware Application February 17, 1948, Serial No. 8,838

1 Claim. (Cl. 308—15)

This invention relates to bearings, and in particular to bearings of the stud type which can be readily mounted on a supporting surface of a machine.

In providing bearings for links, levers, bellcranks, or other moving parts whereby said parts may be mounted on a supporting surface of the machine, it has been the practice heretofore to produce, in a one piece construction, a tool steel stud having a shank and a bearing portion. The bearing portion was then case-hardened and, in order that the shank portion might serve as a rivet for mounting, it was subsequently necessary to attempt to anneal said shank. An extensively used method of annealing was employed, whereby the shank was packed in carbonaceous materials, heated, and cooled slowly. In order to retain its acquired hardness, it was necessary to protect the bearing portion of the stud during the annealing process. Said annealing could not be accurately localized and the bearing portion was ofttimes found to lose its casehardening. Also, due to the inconsistent success of the annealing process, the shank portion often continued brittle and split or chipped during the riveting operation.

Another method of forming the shank and bearing portion, as a whole, from cold rolled steel also proved dissatisfactory. One piece construction made it necessary in this process to protect the shank portion in order to maintain its low carbon status while the bearing portion acquired carbon from a carbon pack and heating process. Said packing and heating was intended solely to make said bearing portion susceptible to a casehardening. Here, again, protection of a definite portion of the stud proved difficult. Also, the subsequent casehardening of the bearing portion was not accurately localized. Therefore, the shank portion often attained an undesired hardness and split or chipped when utilized as a rivet.

Studs manufactured by either of the above methods required a relatively large degree of individual attention and handling, which enhanced the already high expense due to the failures and wastages.

It is an object of the present invention, therefore, to provide a bearing of the stud type that may be produced in two parts, one of cold rolled and the other of tool steel and which may be produced in quantity at a minimum of handling and expense.

Another object of the present invention is to provide in a bearing member adapted for receiving and having a malleable shank united therewith, means effective for reducing the stress induced in the union between the bearing and shank and thereby avoiding a parting of the united members when said shank is utilized as a rivet.

Still another object of the present invention is to provide in a bearing member adapted to have a shank brazed therein, means effective for assisting in obtaining a satisfactory braze between said bearing member and shank.

To the above and other ends which will be perceived upon a reading of the specification, the invention consists in certain features of construction, and combinations and arrangements of parts, all of which will be fully set forth herein and particularly pointed out in the claims.

Other objects and features of the invention will appear from the following description when read in connection with the accompanying drawings, in which Fig. 1 is a fragmentary view of a mounting in connection with which an embodiment of the invention is employed, parts being shown in section;

Fig. 2 is a cross sectional view of the stud in Fig. 1 prior to the employment thereof;

Fig. 3 is a front elevational view of the shank member embodied in Fig. 1;

Fig. 4 is a front elevational view of the bearing member embodied in Fig. 1;

Fig. 5 is a side elevational view of the bearing member embodied in Fig. 1;

Fig. 6 is a full sectional view, somewhat enlarged, of the preferred embodiment of the stud assembly; and Fig. 7 is a full section view, somewhat enlarged, of another embodiment of the stud assembly.

Similar reference characters represent similar parts throughout the several views.

One embodiment of the present invention, as shown employed in Fig. 1 for mounting a moving member 11 on a supporting member 12, and as shown in Fig. 2 prior to its employment, comprises a shank 13 and a bearing member 14. The shank 13, as seen in Fig. 3 also, has collars 15 and 16 formed on one end thereof forming a groove to receive a retaining means 20 while its other end is upsettable for forming a head 17 (Fig. 1). The bearing member 14 is formed to have a bearing portion 18 and a spacing collar 19 (Figs. 4 and 5).

Numerous means may be employed for retaining the moving member on the bearing portion of the stud. In this invention it has been found preferable to use the well known spring clip 20, as partially seen in Fig. 1.

The shank 13, as shown in Figs. 2 and 3, may be, and preferably is, screw machined from cold rolled steel stock, which is of a low carbon content and is not hardenable by heating and quenching, and has formed on its collars 15 and 16 of unequal diameters, the greater being the outermost. The bearing member 14, as shown in Figs. 2, 4 and 5, is screw machined from tool steel stock which is of a high carbon content and is hardenable by heating and quenching and has formed thereon a bearing portion 18, a spacing portion 19, and a longitudinal hole 21 suitable for receiving said shank 13 with a press fit.

Prior to the assemblage of the parts, that portion of the shank upon which the bearing member is to be united is coated with a suitable copper brazing compound.

When the shank 13 is then press fitted into the hole 21 of the bearing member 14, as shown in Fig. 2, it extends beyond the spacing portion 19 to a length determined by the thickness of the machine wall 12 to which the stud is to be attached. The smaller collar 15, when abutted on the bearing portion 18, and the larger collar 16, serve to form an annular groove 22 to receive the aforementioned spring clip. The entire stud assembly is then placed in an atmospherically controlled brazing furnace. At a temperature of approximately 2000° F., the copper compound is melted and capillary action equally distributes the braze. It is this utilization of capillarity which requires the shank 13 to be of a press fit in the said hole 21. The brazed assembly is then permitted to cool slowly in the atmospherically controlled chamber. It is a known fact that cold rolled steel, when heated sufficiently and slowly cooled, relinquishes the hardness acquired in the original cold rolling. Therefore, in effect, the shank 13 is annealed the brazing temperature being sufficient for annealing.

Since no oxygen is present in the above mentioned process, an oxidation scale is not formed. Also, the steel members do not relinquish their carbon contents and the high carbon tool steel member 14 remains favorably susceptible to a hardening process of heating and quenching.

The entire stud is then heated to a temperature of approximately 1500° F. and water quenched. The tool steel portion 14 is thereby casehardened, affording it the desired qualities of a bearing surface. The cold rolled shank portion 13, being of a lower carbon content, remains annealed and malleable and, therefore, may be readily and advantageously utilized as a rivet.

In the preferred embodiment of the present invention, a cold rolled steel shank 23 (Fig. 6) may be screw machined of a uniform diameter and rigidly secured by a copper furnace braze, as hereinbefore described, in a tool steel bearing member 24. Said bearing member may be screw machined so as to provide a spacing collar 19, a bearing portion 18, and an annular groove 22, to receive a spring clip for retaining a moving member on said bearing portion. A hole 25 axially extends into, but not through, the bearing member 24. A counterbored hole 26 forms a shoulder 27. Said shoulder 27 determines the depth to which the shank 23 may be press fitted into the bearing member 24. In this manner it is possible to determine accurately the length of that portion of the shank which may be used as a rivet. Said shoulder also tends to reduce the stress induced in the copper brazed joint during a subsequent riveting operation and thereby prevents parting of the brazed members. A vent hole 28, of a relatively small diameter, facilitates air escapage when the shank 23 is pressed into the counterbored hole 26, thereby preventing a blow out of the shank, or a hampering of the capillary action during the brazing process which process also anneals the shank 23 and leaves the bearing member 24 unaffected.

The assembled stud is then subjected to the hardening process hereinbefore described, with the aforementioned results.

In a variation of the present invention, a cold rolled steel shank 29 (Fig. 7) may be screw machined to a uniform diameter and simultaneously annealed and rigidly secured by a copper furnace braze, as hereinbefore described, in a tool steel bearing member 30. Said bearing member may be screw machined so as to provide a spacing collar 19, a bearing portion 18, an annular groove 22 to receive a spring clip for retaining purposes, and an axially extending hole 31. Said hole extends the length of the bearing member and is necessarily of a dimensional requirement making it a press fit with the shank 29.

When fitted and brazed in place, the extremity 32 of the shank 29 aligns with the edge 33 of the bearing member 30. In this manner it is possible to accurately determine the length of that portion of the shank which is to serve as a rivet. Subsequently, the entire stud is passed through the hereinbefore described hardening process with the aforementioned results.

In order to mount one of the described stud bearings in the manner shown in Fig. 1, the shank 13 is inserted in a suitable hole provided in the supporting member 12. Then while bucked up at the opposite end, the portion of the shank 13 which protrudes from the supporting member 12 is peened over or upset in similar fashion to a rivet. This is possible, due to the annealing of said shank 13 which renders it readily malleable. The moving member 11 may then be fitted to bear on the case-hardened bearing portion 18, retained thereon by the spring clip 20 in the annular groove 22 and suitably spaced from the supporting member 12 by the spacing collar 19. The other described embodiments may be similarly mounted and, in view of what has already been said, the descriptions of the steps leading thereto are believed unnecessary.

While I have described what I consider to be highly desirable embodiments of my invention, it is obvious that many changes in form could be made without departing from my invention, and I, therefore, do not limit myself to the exact forms herein shown and described.

What I claim as new, and desire to secure by Letters Patent, is:

A bearing of the stud type comprising in combination, a tool steel bearing member shaped to provide a collar, a bearing portion, and means for retaining any cooperating member on said portion, a shoulder formed by a counterbore of a hole of relatively less diameter, means for air escape from said hole, and a cold rolled steel shank, to be press fitted and copper furnace brazed in said counterbore and abutted on said shoulder, to serve as a rivet.

JOSEPH J. VISONE.

REFERENCES CITED

The following references are of record in the file of this patent:

UNITED STATES PATENTS

| Number | Name | Date |
| --- | --- | --- |
| 1,550,951 | Dailey | Aug. 25, 1925 |
| 2,197,039 | Gottlieb | Apr. 16, 1940 |
| 2,209,709 | Weatherhead | July 30, 1940 |
| 2,297,878 | Denneen | Oct. 6, 1942 |
| 2,337,290 | Yost | Dec. 21, 1943 |
| 2,385,404 | Crosby | Sept. 25, 1945 |
| 2,081,603 | Sandberg | May 25, 1937 |
| 2,480,114 | Bradbury | Aug. 30, 1949 |
| 2,481,025 | Koch | Sept. 6, 1949 |
| 2,497,224 | Laure | Feb. 14, 1950 |